(12) United States Patent
Chang et al.

(10) Patent No.: US 6,477,008 B1
(45) Date of Patent: Nov. 5, 2002

(54) MAGNETIC RECORDING TRANSDUCER WITH ELECTRONIC SHIELD

(75) Inventors: Thomas Young Chang, San Jose; Shanlin Duan, Fremont; Terence Tin-Lok Lam; Wai C. Leung, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/317,668

(22) Filed: May 24, 1999

(51) Int. Cl.[7] ..................... G11B 5/115; G11B 5/147
(52) U.S. Cl. ................. 360/128; 360/126; 360/317
(58) Field of Search ................ 360/123, 124, 360/125, 126, 128, 317, 318, 319

(56) References Cited

U.S. PATENT DOCUMENTS

| | | | | |
|---|---|---|---|---|
| 4,881,143 A | * | 11/1989 | Bhattacharyya et al. | 360/315 |
| 5,555,147 A | | 9/1996 | Maruyama | 360/317 |
| 5,583,726 A | * | 12/1996 | Mizoshita et al. | 360/319 |
| 5,838,521 A | * | 11/1998 | Ravipati | 360/319 |
| 5,850,325 A | * | 12/1998 | Miyauchi et al. | 360/319 |
| 5,875,080 A | * | 2/1999 | Seagle | 360/123 |
| 6,025,978 A | * | 2/2000 | Hoshi et al. | 360/319 |
| 6,275,360 B1 | * | 8/2001 | Nakamoto et al. | 360/319 |

FOREIGN PATENT DOCUMENTS

| | | | |
|---|---|---|---|
| EP | 0 356 031 | | 2/1990 |
| GB | 2311 889 | | 8/1997 |
| JP | 58-60328 | | 4/1983 |
| JP | 5-266432 | | 10/1993 |
| JP | 06-150260 | * | 5/1994 |
| JP | 07-201021 | * | 8/1995 |
| JP | 11-31305 | * | 2/1999 |

OTHER PUBLICATIONS

IBM Technical Disclosure Bulletin, "*Thermomagnetic Writing/Magnetoresistive Reading on Ferromagnetic Disk*"; vol. 34, No. 2, Jul. 1991; pp. 481, 482.

* cited by examiner

*Primary Examiner*—David L. Ometz
(74) *Attorney, Agent, or Firm*—Robert O. Guillot; IPLO Intellectual Property Law Offices

(57) ABSTRACT

The present invention is a read/write head for writing information to magnetic media and reading information from magnetic media. It includes a write head element for writing information onto magnetic media, a read head element for reading information from the magnetic media, and an electromagnetic field shield element that is disposed between the write head element and the read head element. The shield functions to shield the read head from electromagnetic field energy created by the write head element. An enhanced second embodiment includes an electrical circuit element that is disposed proximate the read head element that functions to generate an electromagnetic field at the read head element that is generally oppositely directed to the electromagnetic field generated by the write head element to reduce the total electromagnetic field that the read head element is exposed to during a writing operation. The method for operating the read/write head in a hard disk drive, includes the steps of writing data onto a hard disk and reading data from the hard disk simultaneously with the data writing. This is accomplished by shielding the read head from the electromagnetic field energy generated during the data writing by utilizing the electromagnetic field shield element that is disposed between the write head element and the said read head element. The electrical circuit element of the second embodiment is preferably interconnected with the write head electric circuit.

38 Claims, 7 Drawing Sheets

MAGNETIC RECORDING TRANSDUCER WITH ELECTRONIC SHIELD

BACKGROUND OF THE INVENTION

1. Field of the Invention

The present invention relates generally to read/write magnetic head assemblies, and more particularly to devices for shielding and canceling unwanted electromagnetic fields within such heads.

2. Description of the Prior Art

In a conventional hard-disk drive (HDD) utilizing so-called MR heads as the recording transducer, the recording head typically uses different elements on the head to perform the write and read operations. Writing on the hard-disk is typically performed using an inductive writing head element, and reading back from the hard-disk is typically performed using a read head having a magnetoresistive (MR) element. The inductive write head element and the MR element are specially-made structures on the read/write head consisting of layers of specially-deposited thin films. The MR element layers are typically deposited onto the substrate first, and the inductive-element layers are deposited after the deposition of the MR element. Significantly, the write head element and the read head element cannot operate at the same time due to interference of the electromagnetic field generated by the write signal with the read-back signal. In other prior art devices the inductive element layers are deposited first and the MR element layers are deposited after them. However, interference between the write signal and the read-back signal still exists, and these devices also cannot simultaneously write to and read from the disk.

There are significant uses in the industry for a read/write head that has the ability to simultaneously write data to a disk and read data from a disk. However, prior art read/write heads cannot perform this task due to the write signal electromagnetic field interference described above. There is therefore a need for a read/write head wherein the writing function and reading function can be simultaneously performed.

SUMMARY OF THE INVENTION

The present invention is a read/write head for writing information to magnetic media and reading information from magnetic media. It includes a write head element for writing information onto magnetic media, a read head element for reading information from the magnetic media, and an electromagnetic field shield element that is disposed between the write head element and the read head element. The electromagnetic field shield functions to shield the read head from electromagnetic field energy created by the write head element to reduce the total electromagnetic field that the read head element is exposed to during a writing operation. An enhanced second embodiment includes an electrical circuit element that is disposed proximate the read head element that functions to generate an electromagnetic field at the read head element that is generally oppositely directed to the electromagnetic field generated by the write head element. The method for operating the read/write head in a hard disk drive, includes the steps of writing data onto a hard disk and reading data from the hard disk simultaneously with the data writing. This is accomplished by shielding the read head from the electromagnetic field energy generated during the data writing by utilizing the electromagnetic field shield element that is disposed between the write head element and the said read head element. The electrical circuit element of the second embodiment is preferably interconnected with the write head electric circuit.

It is an advantage of the present invention that the functions of writing data and reading data can be simultaneously performed.

It is another advantage of the present invention that the electromatic field shield element shields the read head from the electromagnetic field generated by the write head element, such that signal interference of the read head element is minimized.

It is a further advantage of the present invention that an interference reduction electrical circuit element may be disposed proximate the read head element to generate an electromagnetic field that interferes with an electromagnetic field from the write head element.

It is yet another advantage of the present invention that an improved read/write head has been developed which utilizes existing manufacturing technology.

It is yet a further advantage of the present invention that an improved slider having the improved read/write head disposed thereon, and an improved hard disk drive are made possible through the utilization of the present invention.

These and other features and advantages of the present invention will become fully understood upon reading the following detailed description of the preferred embodiments which makes reference to the several figures of the drawings.

DETAILED DESCRIPTION OF THE PREFERRED EMBODIMENTS

In this invention, a magnetic recording head with novel, advantageous structural features is described. A first significant feature is that the inductive write head is deposited first onto the substrate, and the MR read head is deposited after the deposition of the inductive element. When this type of head is used in a hard disk drive, the written area of the hard-disk will pass underneath the read head immediately after passing under the write head, thereby facilitating almost immediate read-after write. This immediate readafter-write can offer significant advantages in magnetic recording systems. Secondly, a write/read electromagnetic field shield layer is deposited after the deposition of the inductive write head and before the deposition of the MR read head. With this shield layer, the recording write head can write onto the hard disk and the MR read head can read back from the hard disk simultaneously. This simultaneous write/read capability is very useful during magnetic recording. Thirdly, to further reduce the interference between the write head and the read head, an interference reduction electrical circuit element can be deposited on top of the read head after the read head deposition is finished. When the writing current is also passed through the interference reduction element, the net electromagnetic field generated from the write head and the interference reduction element is significantly reduced at the MR element of the read head. The inductive write head structure and the MR read head structure, as well as the manufacturing processes of these two structures is similar to the conventional manufacturing processes for read/write heads. The detailed features of the invention are next discussed.

Figure 1:
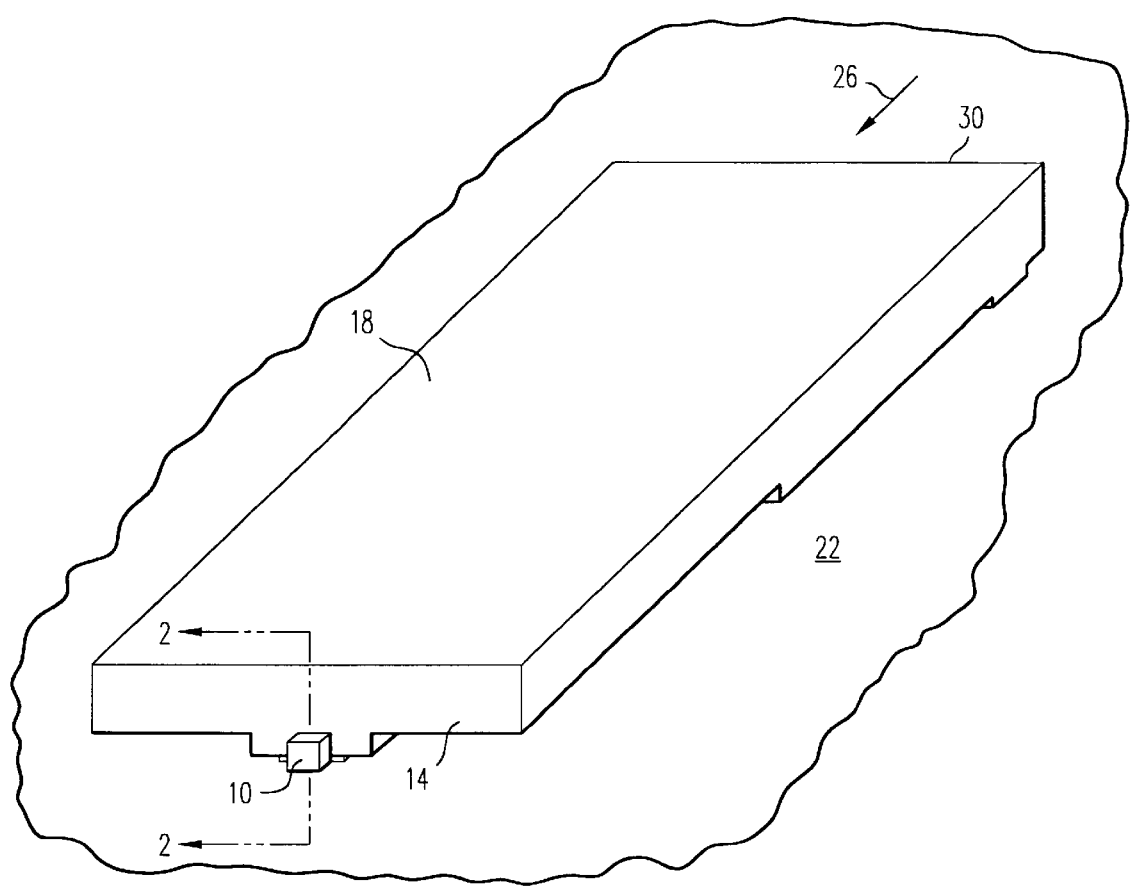
FIG. 1 is a perspective view of a typical hard disk drive slider having a read/write head of the present invention disposed on a rearward surface thereof.

As depicted in FIG. 1, the read/write head 10 of the present invention is disposed on the rearward surface 14 of a typical slider 18. As is known in the prior art, such sliders 18 are typically designed to fly above the surface of a hard disk 22 which rotates in the direction of arrow 26 from the leading surface 30 of the slider 18 towards the rearward surface 14. Fly height tends to decrease with increasing recording density requirements; therefore, near-contact and contact recording are being explored for future application in disk drives. The present invention can also be used beneficially in drives using near contact and contact recording, since the benefits obtained are not dependent on flying height. The novel features of the present invention are best understood in conjunction with FIGS. 2, 3 and 4 as are next discussed.

Figure 2:
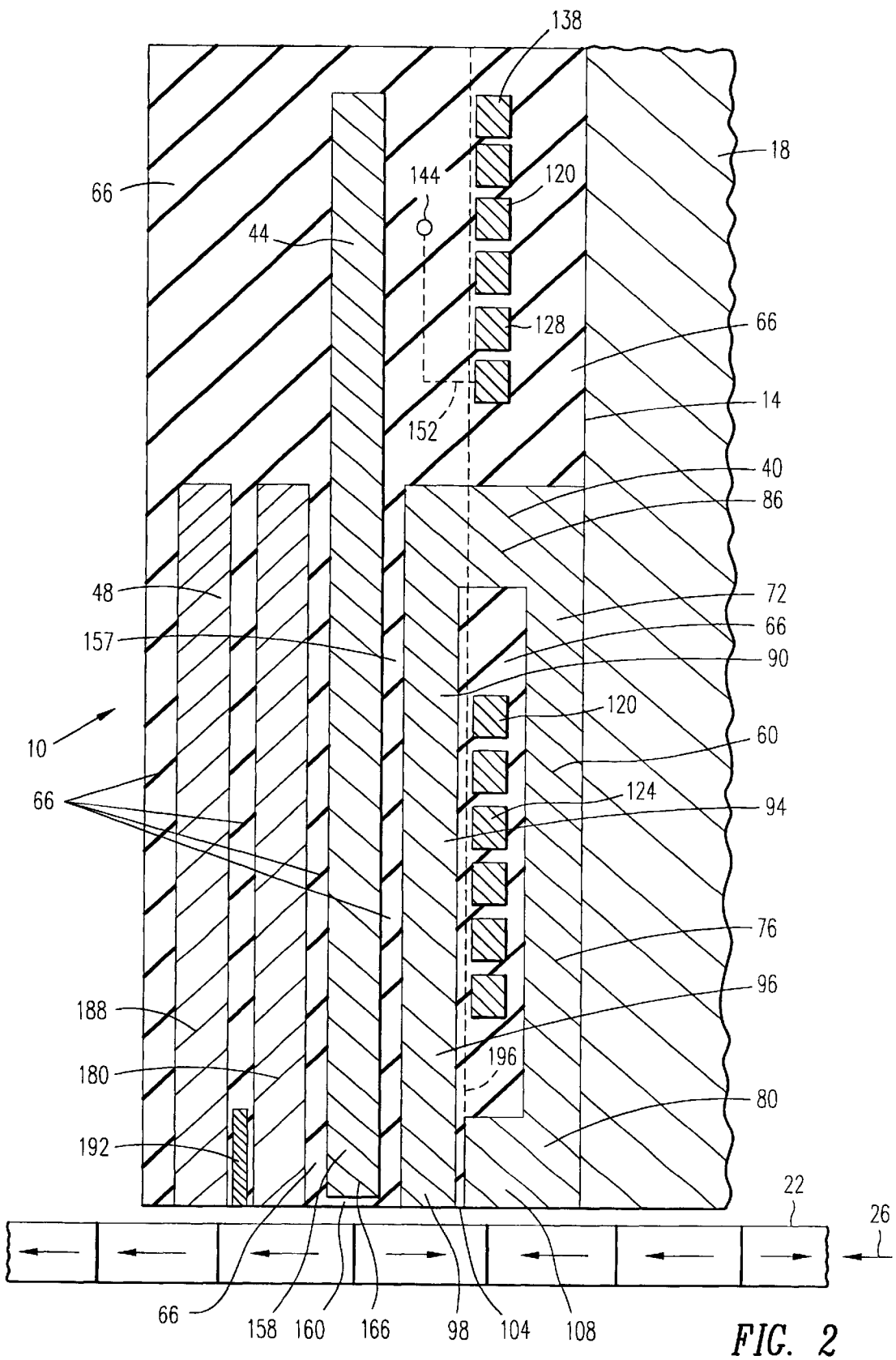
FIG. 2 is a cross-sectional view of a read/write head according to a first embodiment of the present invention, taken along lines 2—2 of FIG. 1.
Figure 3:
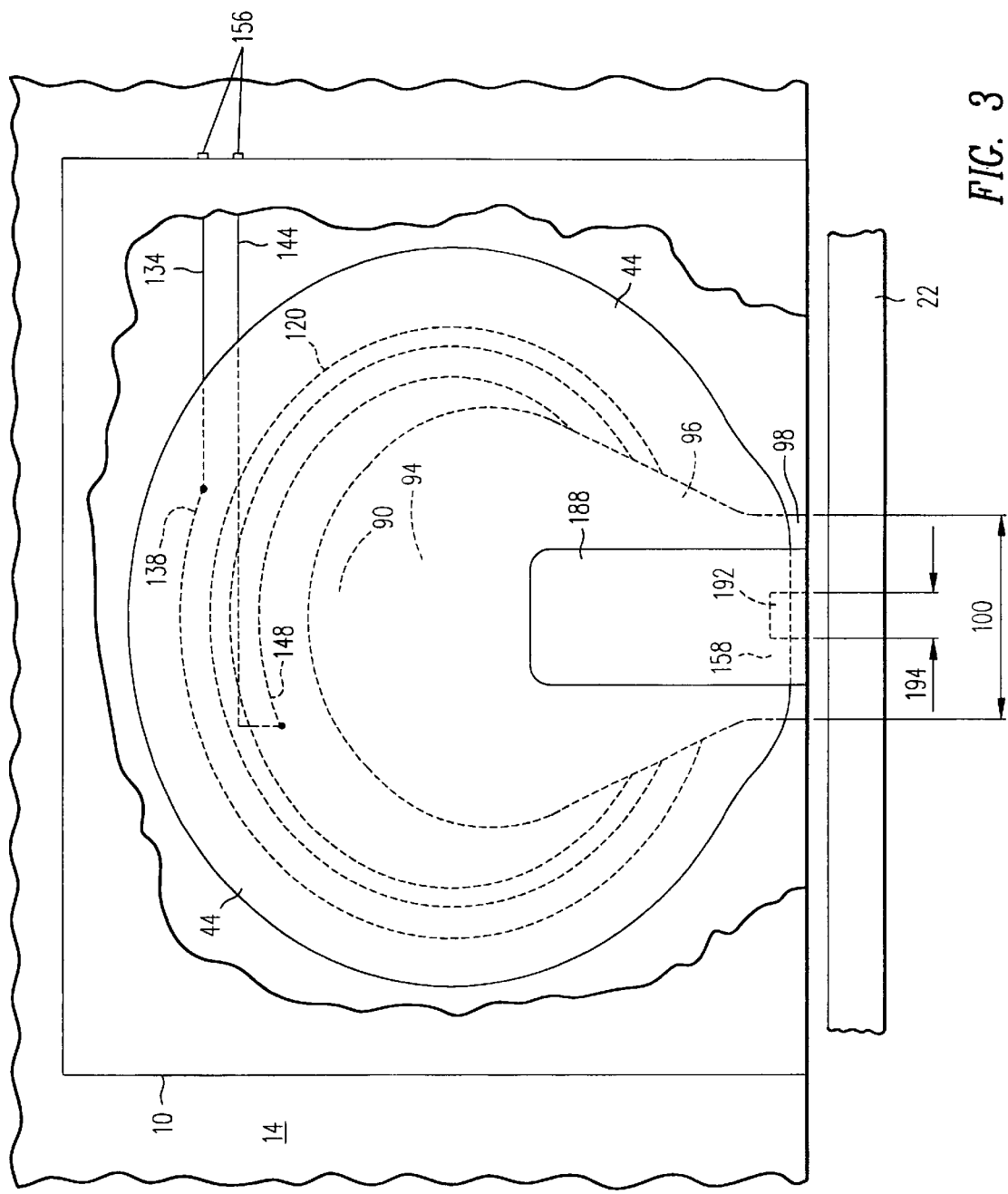
FIG. 3 is an elevational view of the read/write head depicted in FIG. 1 having cut-away portions.
Figure 4:
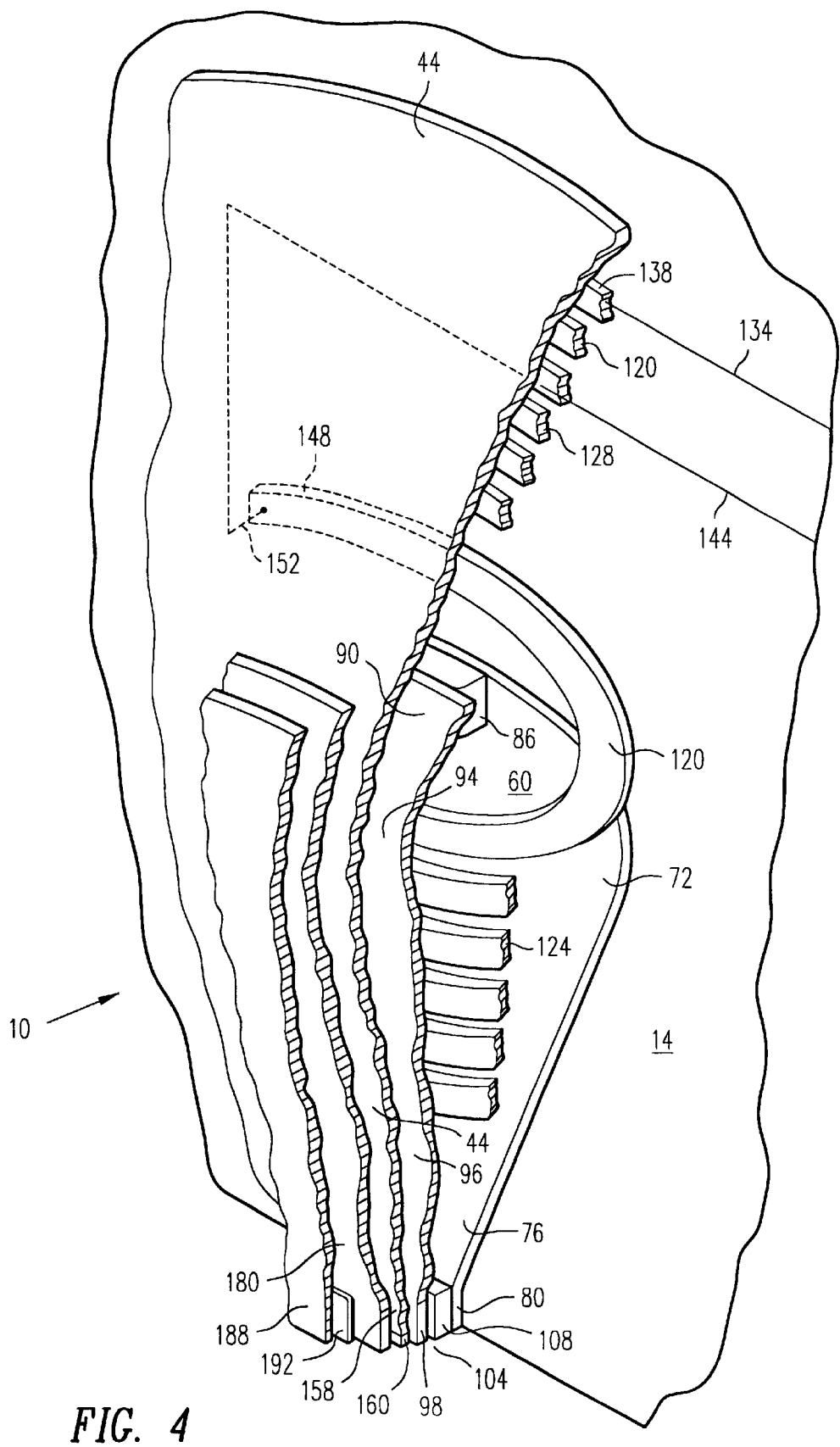
FIG. 4 is a perspective view of the read/write head depicted in FIG. 3 with further cut-away portions to better depict the invention.

FIG. 2 is a side cross-sectional view of the read/write head 10 taken along lines 2—2 of FIG. 1, FIG. 3 is an elevational view of the read/write head 10 having cut-away portions to depict the internal components thereof, and FIG. 4 is a perspective view of the read/write head 10 having cut away portions to better depict the components of the present invention. As depicted in FIGS. 2, 3 and 4, the read/write head 10 generally includes an inductive write head 40 that is formed on the rearward surface 14 of the slider 18, an electromagnetic field shield 44 that is formed on the outward side of the write head 40, and a magnetoresistive (MR) read head 48 that is formed on the outward side of the electromagnetic field shield 44. Each of the elements is next discussed in detail.

The write head 40 includes a first pole 60 piece that is formed on the rearward surface 14 of the slider 18. The various elements of the read/write head 10 are manufactured utilizing thin film deposition techniques that are well known in the semiconductor processing industry, and insulator material 66 is deposited between the various active components of the write head 40, shield 44 and read head 48, as is known to those skilled in the art. The first pole piece 60 of the inductive write head 40 is formed with an enlarged upper section 72 which tapers to a narrow lower section 76 and terminates at its lower end in a relatively narrow pole tip 80. A pole connector element 86 joins the upper end 72 of the first pole piece 60 to the upper end 90 of a second pole piece 94. The second pole piece 94 is generally formed with the same shape as the first pole piece 60; that is, it has an enlarged upper end 90 and a narrowed lower end 96 which terminates in a narrow pole tip 98 having a width 100. The width 100 of the second pole tip 98 need not be the same as the width of the first pole tip 80. A writing gap 104 is formed between the lower tips 80 and 98 of the first and second pole pieces respectively by a gap forming piece 108 formed on the pole tip 80 of the first pole piece 60. The width (W) of the gap forming piece 108 determines the width of the data writing track.

An induction coil 120 is utilized to create the magnetic field that is focused by the pole pieces 60 and 94. The induction coil 120 has a generally circular, spiral shape and is formed with lower turn portions 124 that pass between the pole pieces 60 and 94, and upper turn portions 128 that pass outside of the pole pieces 60 and 94. To provide electrical power to the induction coil 120, a first electrical lead 134 is engaged to an outer end 138 of the coil 120 and a second electrical lead 144 is engaged to an inner end 148 of the induction coil 120. The thin film deposition processing techniques that form the lead 144 may include the formation of vias 152 to is 10 direct the lead 144 out of the plane of the induction coil 120 and towards the external electrical connection terminals 156.

Inductive writing heads are known in the prior art to have shapes and sizes that differ from the embodiment of write head 40 described herein, and the present invention is intended to not be limited to the characteristics of the preferred embodiment of the write head 40 described herein.

After the deposition of an insulation layer 157, the electromagnetic field shield element 44 is next deposited on the outward side of the write head 40. The shield 44 is generally circular in shape in order to provide a shield for the generally circular, spiral induction coil 120, and the diameter of the shield 44 is generally at least as large as the diameter of the induction coil 120. The shield 44 is disposed between the coil 120 and the MR read head 48 such that the MR read head 48 is shielded from the electromagnetic field of the induction coil 120. Conceivably, the shield diameter could be less than the diameter of the induction coil where effective shielding is still maintained; furthermore, where the shape of the induction coil is other than a generally circular shape, the shield will advantageously, although not necessarily, adopt the same shape as the induction coil. Basically, the shape of the shield 44 is a secondary consideration to its primary role of providing an effective electromagnetic field shield for the read head 48.

A lower portion 158 of the shield 44 preferably extends between the write head pole tip 98 and the MR read head, to shield the MR read head from the intense electromagnetic field at the write head gap 104. The electromagnetic field shield 44 is preferably composed of a non-magnetic, electrically conductive material, such as copper or gold, although other materials may prove equally suitable. To avoid corrosion problems, particularly where the shield is composed of copper, an adequate thickness of insulator material 160 is formed across the lower end 166 of the shield 44. The shield 44 does not require any electrical connection in order to perform its shielding function. As will be understood by those skilled in the art, the thickness of the shield 44 is preferably at least skin depth. Skin depth refers to a thickness of conductive material that is sufficient to absorb the electromagnetic field energy that interacts with it, and skin depth is related to the permeability and conductivity of the material that comprises the shield 44, as well as the operating frequency of the electromagnetic energy that interacts with it. Formulas for determining skin depth are known to those skilled in the art. In the preferred embodiment of the present invention, the shield 44 is composed of copper having a thickness in the range of from approximately 0.5 microns to approximately 25 microns, with a preferred thickness of approximately 10 microns.

Following the formation of the shield element 44, an insulator layer is deposited and the components of the read head 48 are next deposited; the components thereof are known to those skilled in the art. Basically, the read head 48 includes a first magnetic shield 180 and a second magnetic shield 188 and a magnetoresistive (MR) element 192 disposed therebetween. The width 194 of the MR element 192 is preferably significantly less than the width (W) of the gap forming piece 108 of the write head 40, such that the read head 48 will be disposed above the same disk track that the write head 40 is on, even when the read/write head 10 is disposed at a maximum skew angle relative to the track direction, as will be understood by those skilled in the art. In the preferred embodiment, the width 194 of the MR element 192 is from approximately the width (W) of the gap forming piece 108 to approximately 1/10 of the width (W) of the gap forming piece 108. The distance between the write head 40 and read head 48 varies from approximately 1.5 microns to approximately 35 microns depending upon the thickness of the electromagnetic field shield 44, the insulation layers and the MR element first magnetic shield 180.

As indicated hereabove, the manufacturing process for the read/write head 10 involves thin film processing techniques that are known to those skilled in the art. Of particular concern to the creation of an operable device is that the elements of the MR head 48 be deposited flat and parallel to each other. To achieve this, the manufacturing method of the present invention preferably includes at least one planarization step. Particularly, as depicted in FIG. 2, a planarization layer 196 (shown in phantom) may be formed subsequent to the deposition of the induction coil 120 and the pole tip piece 108. Processes such as chemical-mechanical polishing are utilized to form the planarization layer 196.

The electromagnetic field shield 44 is a significant feature of the present invention in that it allows the write head 40 and the read head 48 to function simultaneously. That is, the read/write head 10 of the present invention may be utilized to write data on a track and simultaneously read data from the same track because the electromagnetic field shield 44 substantially eliminates electromagnetic interference between the write head electromagnetic fields and the read head which seeks to detect the magnetic fields of the media passing thereunder. Thus, while prior art devices have included a write head disposed in front of a read head, the two heads 40 of such devices do not effectively function simultaneously because of the interference that the electromagnetic fields of the write head cause to the read head. Thus, the read/write head 10 of the present invention can be utilized to write data and nearly immediately thereafter read the data to verify it in an ongoing process such that the write head and read head are operating simultaneously.

Figure 5:
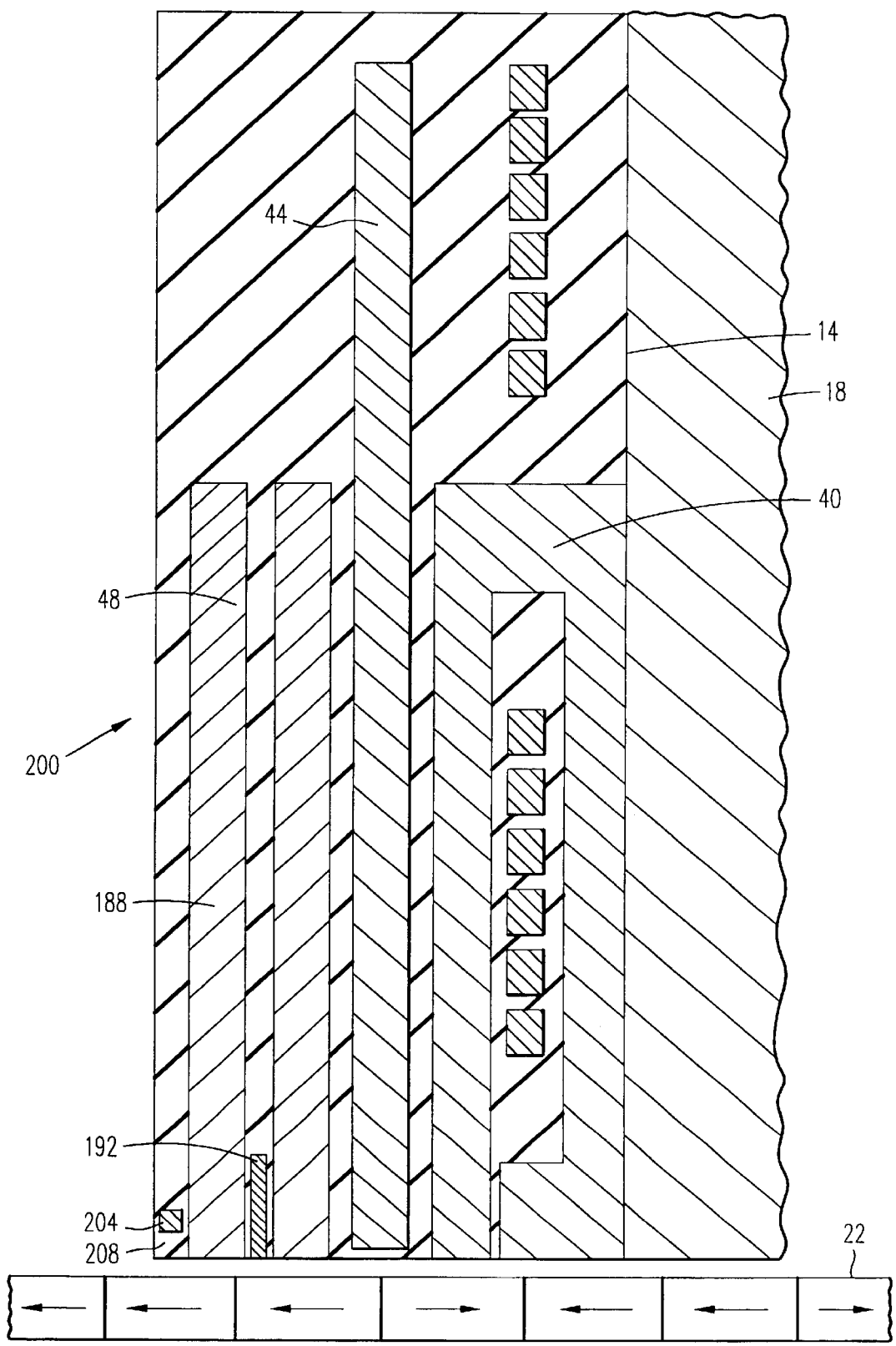
FIG. 5 is a side cross-sectional view of a read/write head according to a second embodiment of the present invention that is similar to the view depicted in FIG. 2.
Figure 6:
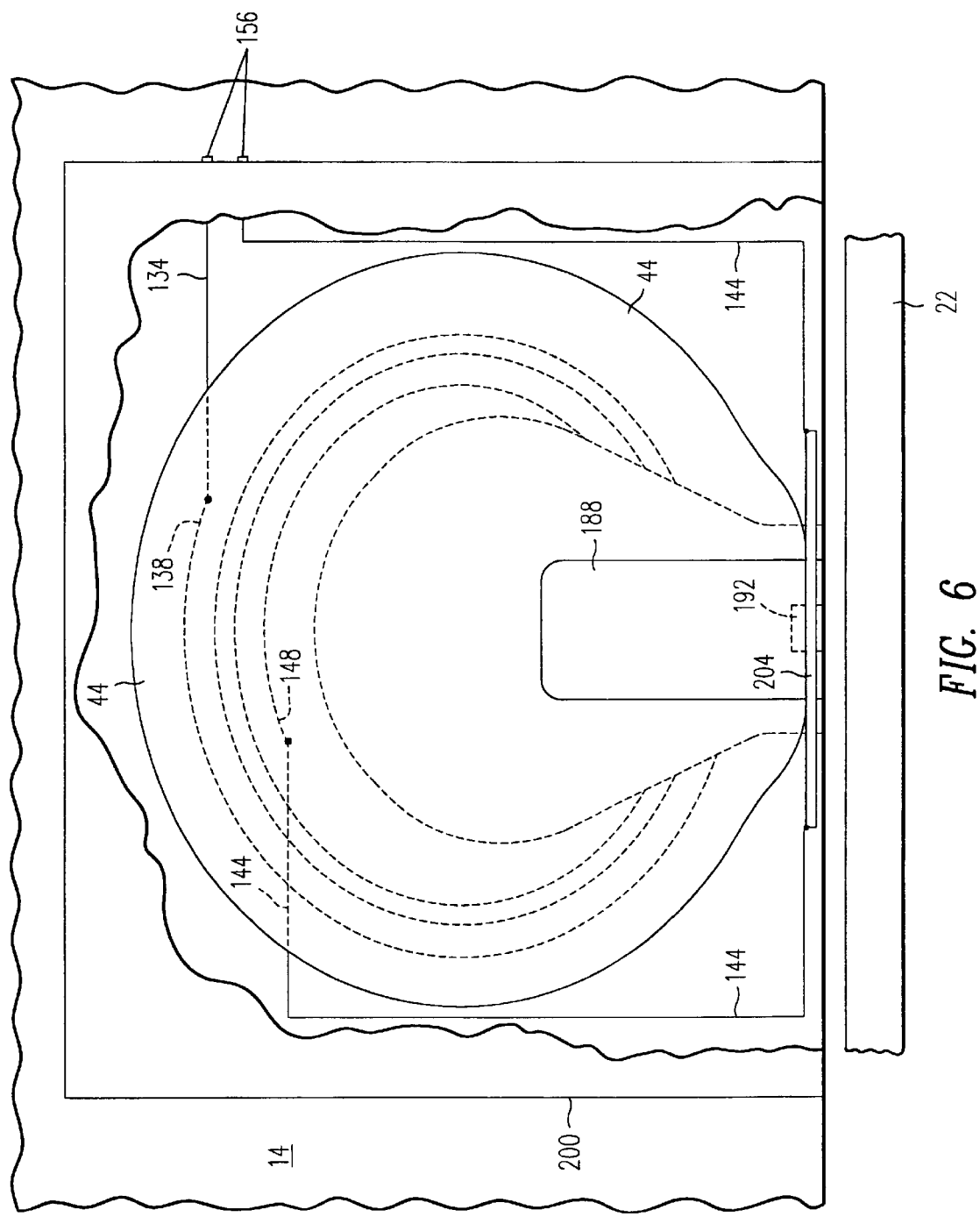
FIG. 6 is an elevational view of the embodiment of the read/write head depicted in FIG. 5 having cut-away portions and being similar to the view depicted in FIG. 3.
Figure 7:
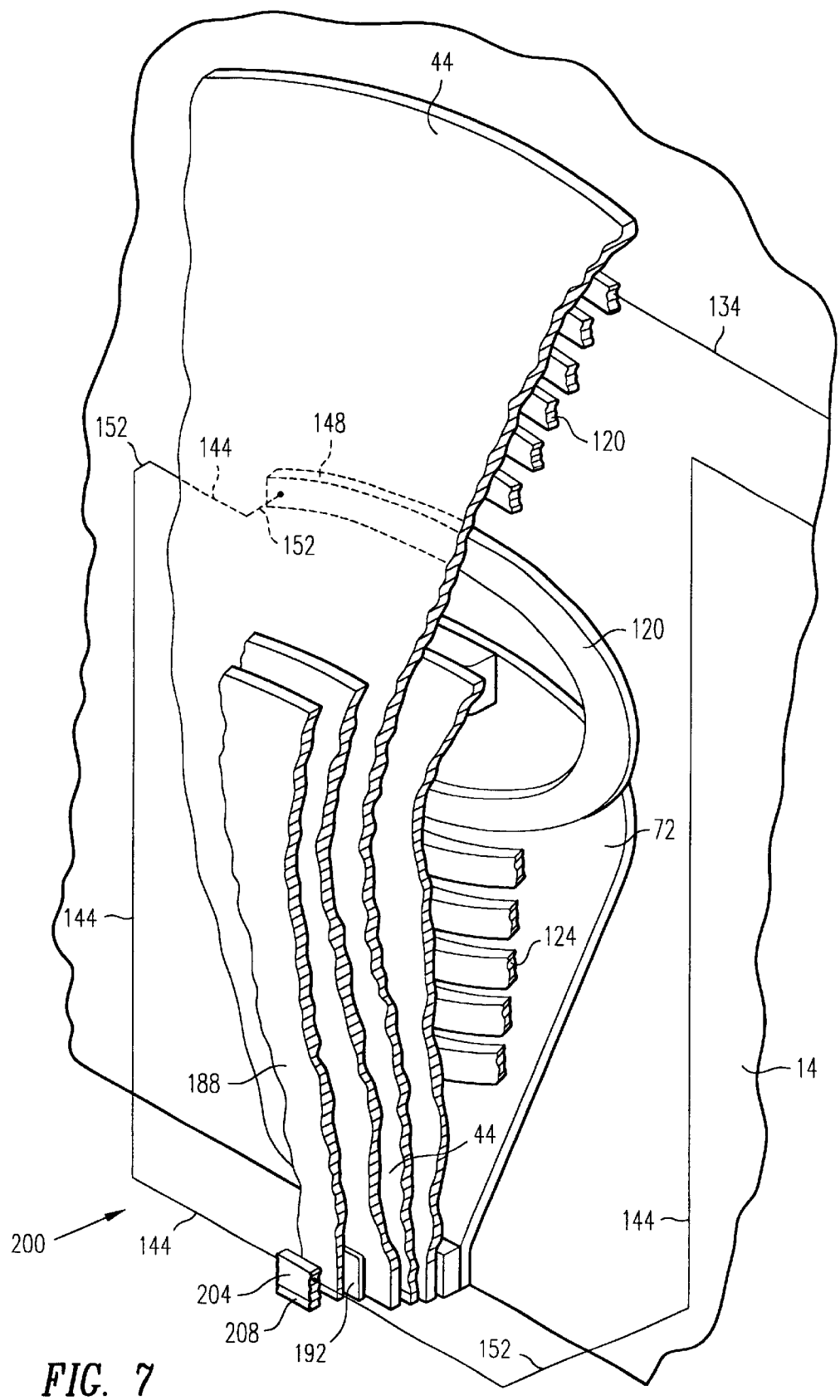
FIG. 7 is a perspective view of the read/write head depicted in FIG. 6 having further cut-away portions to better depict the invention, and being similar to the view depicted in FIG. 4.

A read/write head 200 according to a second embodiment of the present invention is depicted in FIGS. 5, 6 and 7, wherein FIG. 5 is a side cross-sectional view of the read/write head 200 that is similar to the view depicted in FIG. 2, FIG. 6 is a plan view that is similar to the view depicted in FIG. 3, and FIG. 7 is a perspective view that is similar to the view depicted in FIG. 4. As will be understood from the following description, the read/write head 200 of the second embodiment possesses many of the same elements as are found in the read/write head 10 of the first embodiment, and identical numerals are utilized to identify identical structural elements. The novel additional feature of the read/write head 200 of the second embodiment comprises the placement of an electrically conductive circuit line element 204 behind the read head 48 to provide an electromagnetic field which interferes with and reduces the electromagnetic field at the read head MR element 192 that is caused by the write head and not absorbed by the electromagnetic field shield 44, as is next described.

As depicted in FIGS. 5, 6 and 7, the read/write head 200 includes an inductive write head 40 that is disposed proximate the rear surface 14 of the slider 18. An electromagnetic field shield 44 is disposed behind the write head 40 and a read head 48 is disposed behind the shield 44. An electrically conductive circuit line element 204 is deposited behind the read head 48 such that a layer of insulation separates the conductive line element 204 from the second magnetic shield 188 of the read head 48. The conductive line element 204 is deposited proximate the MR element 192, and a sufficient thickness of insulator material 208 may be disposed beneath the element 204 to prevent corrosion problems, particularly where the element 204 is composed of copper.

Electrical power for the element 204 is provided through the induction coil circuitry. That is, the electrical line 144 from the inner end 148 of the induction coil is routed through the electrical conductive line element 204, in distinction to its routing in the read/write head embodiment 10 as is best depicted in FIG. 4. Particularly, as is best seen in FIG. 7, the electrical lead 144 is fed through vias 152 around the shield 44 and outwardly to the substrate layer that includes the electrical conductive line element 204. The electrical lead 144 passes through the conductive line element 204 and thence inwardly and upwardly to its outer terminal connection 156. An important feature of the read/write head 200 is that no new electrical connections or additional read/write head terminals are required to obtain the performance enhancement provided by the electrical circuit element 204. This is because the electrical lead 144 of the induction coil 120 is routed through the conductive line element 204 and thence to the terminal 156.

It is therefore to be understood that the electrical current that passes through the induction coil 120 to create the electromagnetic field for the write head, also passes through the conductive line element 204, such that it creates a small electromagnetic field by its passage through the conductive line element 204. Furthermore, as will be understood by those skilled in the art, owing to the direction of the electrical current through the conductive line element 204, the electromagnetic field generated by the conductive line element 204 is directed oppositely to the electromagnetic field that is generated by the write head. That is, with specific regard to the location of the MR element 192, where the write head 40 (according to the right hand rule) creates a generally downward electromagnetic field at the MR element 192, the conductive line element 204 creates a generally upward electromagnetic field; whereby the electromagnetic field of the conductive line element 204 acts to interfere with and cancel the effects of the electromagnetic field generated by the write head 40. Thus, where the electromagnetic field shield 44 imperfectly blocks the effects of the electromagnetic field generated by the write head 40, the conductive line element 204 generates an interfering electromagnetic field that acts to cancel the effect of the write head electromagnetic field upon the MR element 192. The conductive line element 204 in the read/write head embodiment 200 therefore enhances the ability of the write head 40 and the read head 48 to function simultaneously and with reduced interference, such that the read/write head 200 is able to write and read simultaneously.

While the present invention has been shown and described with regard to certain preferred embodiments, it will be understood by those skilled in the art upon comprehending the preceding disclosure that certain alterations and modifications in form and detail may be made therein. It is therefore intended by the inventors that the following claims cover all such alterations and modifications that nevertheless include the true spirit and scope of the invention.

What We claim is:

1. A read/write head for writing information to magnetic media and reading information from magnetic media, comprising:
   a write head for writing information onto magnetic media;
   a read head for reading information from said magnetic media, said read head including a first magnetic shield, a second magnetic shield and an MR element disposed therebetween;
   an electromagnetic field shield being disposed between said write head and said read head and functioning to shield said read head from electromagnetic field energy created by said write head; and
   wherein said write head is disposed upon a slider surface, a first insulation layer is disposed upon said write head, said electromagnetic field shield is disposed upon said first insulation layer, a second insulation layer is disposed upon said electromagnetic field shield, and said read head is disposed upon said second insulation layer.

2. A read/write head as described in claim 1 wherein said write head includes a first magnetic pole and a second magnetic pole, and an induction coil that is disposed between said first and second magnetic poles, and wherein said electromagnetic field shield is formed with a shape that generally corresponds to an in-plane shape of said induction coil.

3. A read/write head as described in claim 2 wherein said induction coil is generally circular and has a coil diameter, and wherein said electromagnetic field shield is generally circular and has a shield diameter that is at least as large as said coil diameter.

4. A read/write head as described in claim 1 wherein said electromagnetic field shield is composed of an electrically conductive material.

5. A read/write head as described in claim 4 wherein said electromagnetic field shield has a thickness that is greater than skin depth.

6. A read/write head as described in claim 5 wherein said electromagnetic field shield is composed of copper, and has a thickness in the range of from approximately 0.5 microns to approximately 25 microns.

7. A read/write head as described in claim 5 wherein said electromagnetic field shield is composed of copper and has a thickness of approximately 10 microns.

8. A read/write head as described in claim 1 further including an electromagnetic field interference means being disposed proximate said read head and functioning to generate an electromagnetic field at said read head that is generally oppositely directed to an electromagnetic field at said read head generated by said write head.

9. A read/write head as described in claim 1 further comprising a conductive line connected to said write head and wherein said conductive line passes proximate to said read head so that an electrical current flowing in said conductive line will generate an electromagnetic field at said read head which is essentially oppositely directed to an electromagnetic field at said read head generated by said write head.

10. A read/write head as described in claim 9 wherein said read head is disposed between said write head and said conductive line, and wherein said electrical current also passes through an induction coil of said write head.

11. A read/write head as described in claim 1 wherein said read head includes an MR element, wherein said write head is formed with a write head tip having a tip width W, and wherein said MR element has a width that is from approximately W to approximately 1/10th of W.

12. A slider device for a hard disk drive comprising:
   a slider body being adapted to fly over the surface of a hard disk;
   a read/write head being formed on a surface of said slider body, said read/write head including:
      a write head for writing information onto magnetic media,
      a read head for reading information from said magnetic media, said read head including a first magnetic shield, a second magnetic shield and an MR element disposed therebetween;
      an electromagnetic field shield being disposed between said write head and said read head and functioning to shield read head from electromagnetic field energy created by said write head; and
      wherein said write head is disposed upon said slider body surface, a first insulation layer is disposed upon said write head, said electromagnetic field shield is disposed upon said first insulation layer, a second insulation layer is disposed upon said electromagnetic field shield, and said read head is disposed upon said second insulation layer.

13. A slider device as described in claim 12 wherein said write head includes a first magnetic pole and a second magnetic pole, and an induction coil that is disposed between said first and second magnetic poles, and wherein said electromagnetic field shield is formed with a shape that generally correspond to an in-plane shape of said induction coil.

14. A slider device as described in claim 13 wherein said induction coil is generally circular and has a coil diameter, and wherein said electromagnetic field shield is generally circular and has a shield diameter that is at least as large as said coil diameter.

15. A slider device as described in claim 12 wherein said electromagnetic field shield is composed of an electrically conductive material.

16. A slider device as described in claim 15 wherein said electromagnetic field shield has a thickness that is greater than skin depth.

17. A slider device as described in claim 16 wherein said electromagnetic field shield is composed of copper, and has a thickness in the range of from approximately 0.5 microns to approximately 25 microns.

18. A slider device as described in claim 16 wherein said electromagnetic field shield is composed of copper and has a thickness of approximately 10 microns.

19. A slider device as described in claim 12 further including an electromagnetic field interference means being disposed proximate said read head element and functioning to generate an electromagnetic field at said read head that is generally oppositely directed to an electromagnetic field generated by said write head.

20. A slider device as described in claim 12 further comprising a conductive line connected to said write head and wherein said conductive line passes proximate to said read head so that electrical current flowing in said conductive line will generate an electromagnetic field at said read head which is oppositely directed to an electromagnetic field at said read head generated by said write head.

21. A slider device as described in claim 20 wherein said read head is disposed between said write head and said conductive line, and wherein said electrical current also passes through an induction coil of said write head.

22. A slider device as described in claim 12 wherein said read head includes an MR element, and wherein said write head is formed with a write head tip having a tip width W, and wherein said MR element has a width that is from approximately W to approximately 1/10th of W.

23. A hard disk drive, comprising:
   at least one disk being adapted for rotary motion;
   at least one slider device having a slider body portion and being adapted to fly over said hard disk;
   a read/write head being formed on a surface of said slider body, said read/write head including:
      a write head for writing information onto magnetic media;
      a read head for reading information from said magnetic media, said read head including a first magnetic shield, a second magnetic shield and an MR element disposed therebetween;
      an electromagnetic field shield being disposed between said write head and said read head and functioning to shield said read from electromagnetic field energy created by said write head; and
      wherein said write head is disposed upon said slider body surface, a first insulation layer is disposed upon said write head, said electromagnetic field shield is disposed upon said first insulation layer, a second insulation layer is disposed upon said electromagnetic field shield, and said read head is disposed upon said second insulation layer.

24. A hard disk drive as described in claim 23 wherein said write head includes a first magnetic pole and a second magnetic pole, and an induction coil that is disposed between said first and second magnetic poles and wherein said electromagnetic field shield is formed with a shape that generally corresponds to an in-plane shape of said induction coil.

25. A hard disk drive as described in claim 24 wherein said induction coil is generally circular and has a coil diameter, and wherein said electromagnetic field shield is generally circular and has a shield diameter that is at least as large as said coil diameter.

26. A hard disk drive as described in claim 25 wherein said electromagnetic field shield is composed of an electrically conductive material.

27. A hard disk drive as described in claim 26 wherein said electromagnetic field shield has a thickness that is greater than skin depth.

28. A hard disk drive as described in claim 27 wherein said electromagnetic field shield is composed of copper, and has a thickness of in the range of from approximately 0.5 microns to approximately 25 microns.

29. A hard disk drive as described in claim 27 wherein said electromagnetic field shield is composed of copper and has a thickness of approximately 10 microns.

30. A hard disk drive as described in claim 23 further including an electromagnetic field interference means being disposed proximate said read head element and functioning to generate an electromagnetic field at said read head element that is generally oppositely directed to an electromagnetic field at said read head generated by said write head element.

31. A hard disk drive as described in claim 23 further comprising a conductive line connected to said write head and wherein said conductive line passes proximate to said read head so that an electrical current flowing in said conductive line will generate an electromagnetic field at said read head which is essentially oppositely directed to an electromagnetic field at said read head generated by said write head.

32. A hard disk drive as described in claim 31 wherein said read head is disposed between said write head and said conductive line, and wherein said electrical current also passes through an induction coil of said write head.

33. A hard disk drive as described in claim 23 wherein said read head includes an MR element, and wherein said write head is formed with a write head tip having a tip with W, and wherein said MR element has a width that is from approximately W to approximately 1/10th of W.

34. A method for operating a read/write head of a hard disk drive, comprising the steps of:
   writing data onto magnetic media of a hard disk utilizing a write head;
   reading data from said magnetic media of said hard disk utilizing a read head, said step of reading data being conducted simultaneously with said step of writing data;
   shielding said read head from electromagnetic field energy generated by said write head by utilizing an electromagnetic field shield that is disposed between said write head and said read head and;
   wherein said read/write head is fabricated upon a hard disk drive slider member, and wherein said write head is fabricated upon a surface of said slider element, a first insulation layer is fabricated upon said write head, said electromagnetic field shield is fabricated upon said first and said read head is fabricated upon said second insulation layer.

35. A method as described in claim 34 including the further step of generating an interference electromagnetic field at said read head, said interference electromagnetic field being directed oppositely to an electromagnetic field that is generated by said write head at said read head.

36. A method as described in claim 35 including the further step of generating said interference electromagnetic field simultaneously with said step of writing data.

37. A method as described in claim 35 including the further step of providing electrical current to said write head and simultaneously providing electrical current to generate said interference electromagnetic field.

38. A method as described in claim 37 wherein said electrical current that is provided to said write head is also utilized to generate said interference electromagnetic field.

* * * * *